(12) United States Patent
Besnard

(10) Patent No.: US 9,482,390 B2
(45) Date of Patent: Nov. 1, 2016

(54) SUPPLY SYSTEM FOR A LIQUID

(75) Inventor: Pierric Besnard, Laval (FR)

(73) Assignee: INERGY AUTOMOTIVE SYSTEMS RESEARCH, Brussels (BE)

( * ) Notice: Subject to any disclaimer, the term of this patent is extended or adjusted under 35 U.S.C. 154(b) by 0 days.

(21) Appl. No.: 14/241,545

(22) PCT Filed: Aug. 8, 2012

(86) PCT No.: PCT/EP2012/065543
§ 371 (c)(1),
(2), (4) Date: Mar. 13, 2014

(87) PCT Pub. No.: WO2013/029950
PCT Pub. Date: Mar. 7, 2013

(65) Prior Publication Data
US 2014/0196808 A1    Jul. 17, 2014

(30) Foreign Application Priority Data

Aug. 29, 2011 (EP) ..................................... 11179190

(51) Int. Cl.
| | | |
|---|---|---|
| *E03B 7/10* | (2006.01) | |
| *F16L 53/00* | (2006.01) | |
| *F17C 13/10* | (2006.01) | |
| *F01N 3/20* | (2006.01) | |
| *F16L 9/18* | (2006.01) | |
| *F16L 11/20* | (2006.01) | |

(Continued)

(52) U.S. Cl.
CPC .............. *F17C 13/10* (2013.01); *F01N 3/2066* (2013.01); *F16L 9/18* (2013.01); *F16L 11/20* (2013.01); *F16L 55/052* (2013.01); *F16L 55/054* (2013.01); *F01N 2610/02* (2013.01); *F01N 2610/10* (2013.01); *F01N 2610/14* (2013.01); *Y02T 10/24* (2013.01)

(58) Field of Classification Search
CPC ....................................................... F17C 13/10
USPC ..................................................... 138/32, 114
See application file for complete search history.

(56) References Cited

U.S. PATENT DOCUMENTS

| | | | | |
|---|---|---|---|---|
| 4,342,202 A | * | 8/1982 | Knutson | ......................... 62/243 |
| 2004/0262333 A1 | | 12/2004 | Huber et al. | |

(Continued)

FOREIGN PATENT DOCUMENTS

| | | |
|---|---|---|
| DE | 10 2006 019 973 | 10/2007 |
| DE | 10 2006 048 500 | 4/2008 |

(Continued)

OTHER PUBLICATIONS

International Search Report Issued Dec. 14, 2012 in PCT/EP12/065543 Filed Aug. 8, 2012.

(Continued)

*Primary Examiner* — Paul R Durand
*Assistant Examiner* — Vishal Pancholi
(74) *Attorney, Agent, or Firm* — Oblon, McClelland, Maier & Neustadt, L.L.P.

(57) ABSTRACT

A supply system for liquid including a liquid tank and a liquid supply line forming a passage for the liquid from the tank to an outlet of the supply system. The supply line includes at least one part configured to form at least one gas pocket communicating with the passage to take up a change of volume of the liquid in event of freezing. Such a system can be used in a selective catalytic reduction system (SCR).

20 Claims, 3 Drawing Sheets

Figure 4B:
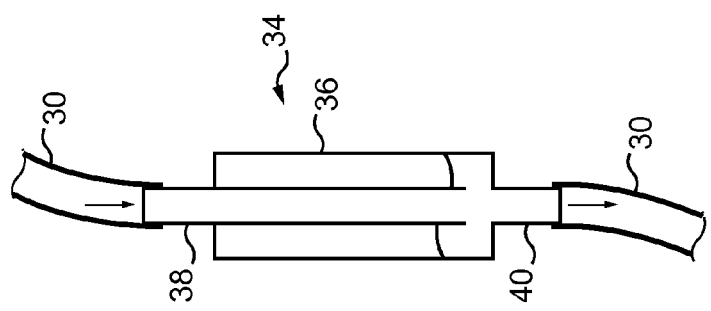

(51) Int. Cl.
*F16L 55/052* (2006.01)
*F16L 55/054* (2006.01)

(56) References Cited

U.S. PATENT DOCUMENTS

| | | |
|---|---|---|
| 2009/0013670 A1* | 1/2009 | Cooke .............................. 60/286 |
| 2010/0064670 A1 | 3/2010 | Starck et al. |
| 2010/0115932 A1* | 5/2010 | Kassel et al. .................... 60/299 |
| 2011/0194987 A1* | 8/2011 | Hodgson et al. ............. 422/187 |

FOREIGN PATENT DOCUMENTS

| | | |
|---|---|---|
| DE | 10 2007 012 918 | 9/2008 |
| DE | 20 2007 009 337 | 12/2008 |
| EP | 1 339 956 B1 | 11/2001 |
| EP | 1 664 713 B1 | 8/2004 |
| JP | 2004-144093 | 5/2004 |
| JP | 2008-101564 | 5/2008 |
| JP | 2009-115030 | 5/2009 |
| WO | WO 2006/064028 A1 | 6/2006 |
| WO | 2006 136306 | 12/2006 |

OTHER PUBLICATIONS

Office Action issued Jul. 4, 2016, in Japanese Patent Application No. 2014-527571 (w/English language translation).

\* cited by examiner

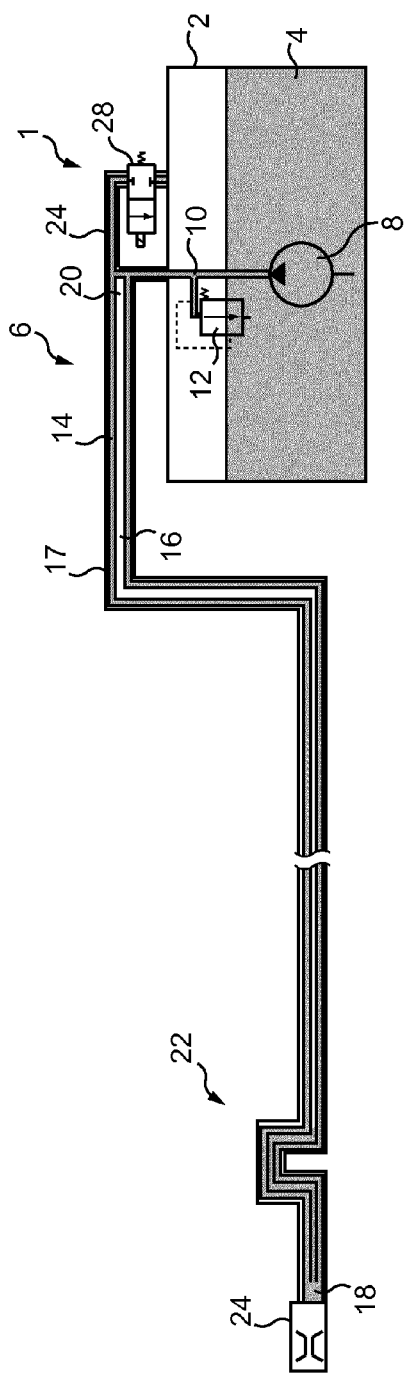
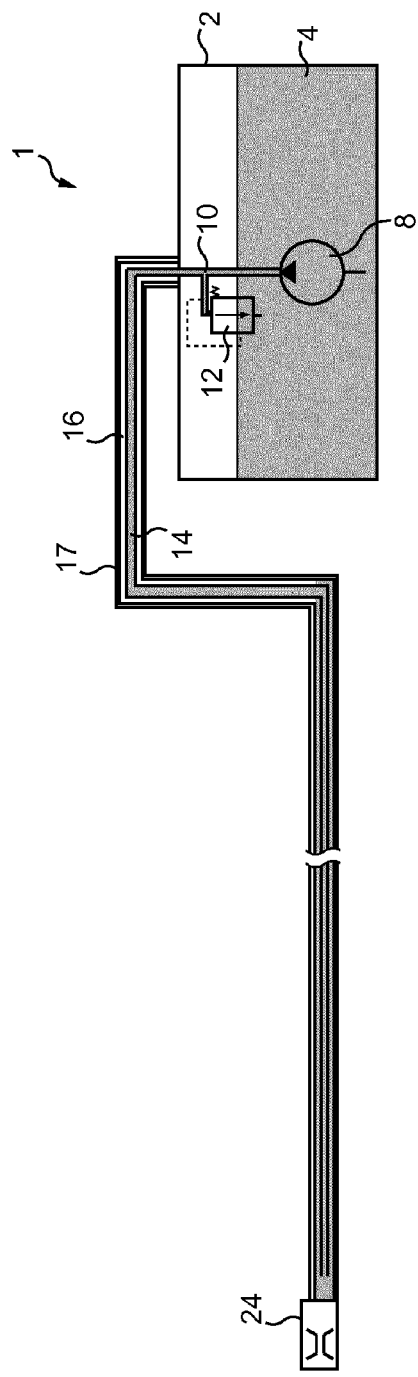
Fig. 1
Fig. 2

SUPPLY SYSTEM FOR A LIQUID

The present invention relates to a system for supplying a liquid which is liable to solidify in case of frost, in particular for a vehicle, such as an internal combustion engine exhaust gas reducing agent.

To meet the requirements concerning emissions from vehicles, in particular heavy goods vehicles, it is necessary to reduce the amount of oxides of nitrogen $NO_x$ discharged in the atmosphere. The method generally proposed is to use SCR (Selective Catalytic Reduction) which allows for reduction of the oxides of nitrogen by injecting a reducing agent, generally ammonia, into the exhaust system. This ammonia may originate from the thermolytic decomposition of a solution of an ammonia precursor, the concentration of which may be the eutectic concentration. An ammonia precursor such as this is generally a solution of urea.

The vehicles are generally equipped for this purpose with a tank containing a urea solution, a device for metering the amount of urea to be injected into the exhaust line and a device for supplying the urea solution to the device for metering the amount of urea to be injected. In general, the supply device comprises a supply line, a pump and a filter.

The supply line generally feeds the solution to an injector at one end of the line, whereas the opposite end emerges into the tank. The pump is located inside or outside the tank and a pressure regulation is foreseen to regulate the pressure of the reducing agent provided to the injector.

To prevent the components of the supply system, and in particular those mentioned above, from being damaged following the solidification of the aqueous urea solution in freezing conditions (generally an eutectic with 32.5% by weight of urea, freezes at −11° C.), it is advantageous to periodically purge the supply line as well as the components located over this supply line.

Various systems for performing such a purge have been provided in the prior art.

As described for example in applications WO 2006/064028 and WO 2009/007405 in the name of the applicant, this purge can take place by using compressed air or by sucking the exhaust gases or air through an injector, either by using a 4/2-way valve or by reversing the rotational direction of the pump.

It is also preferable to equip the system with a non-return device (preferably a bell/siphon combination) that prevents liquid (reducing agent) from entering into the purged elements once the pump has been stopped, while allowing the supply of liquid to the supply line when the pump operates/starts in the supply mode.

EP 1 664 713 and EP 1 339 956 propose, on the other hand, to protect only a particular component of such a system, namely the pressure sensor, either via additional bellows bordering a compressible volume which takes up a change of volume of the reducing agent in the event of freezing (EP 1 664 713) or via a valve body that can carry out a compensating movement in a line to increase the volume thereof in the event of freezing of a reducing agent located in this line (EP 1 339 956).

It appears from the foregoing that substantial modifications are necessary to protect the supply system or a component thereof against frost and might limit the protection to a particular component.

The present invention aims to solve these problems by proposing a supply system which is completely protected against frost in a manner that is simple, effective and reliable.

For this purpose, the present invention proposes a supply system for a liquid, comprising a liquid tank and a liquid supply line forming a passage for the liquid from the tank to an outlet of the supply system, characterized in that the supply line is provided with at least one part designed to form at least one gas pocket communicating with said passage to take up a change of volume of the liquid in the event of freezing.

Thanks to these provisions, the supply line as well as the components located over this line are protected against frost without any need to purge the supply line and with means which are very simple and easy to implement (modification of the supply line) and do not pose any problem of reliability.

Moreover, such a gas pocket, preferably an air pocket, provides an improved pressure regulation in the case of an exhaust gas reduction system, by damping the pressure pulses and reducing the pressure range during injection.

In addition, such a system does not call for particular conditions as to the location of the means for protecting it against frost (the gas pocket in practice).

By gas pocket, is meant a recess storing gas, preferably air, the volume of which is defined/dimensioned considering the expansion volume of the liquid in freezing conditions in order to avoid/limit the pressure in the supply line and on the components located over this line. It might be as small as a bubble (in which case there generally are several of them) and can take various forms as it will be seen in more details below.

In the particular case where the system is used in a vehicle, the part forming the gas pocket can be installed in different locations in a vehicle such as on top of the SCR tank, on top of the fuel tank, in wheel areas, on fuel or SCR filler pipes, etc. More than one part defining a gas pocket may be connected to/comprised in the supply line.

According to a particular feature, at least a portion of the gas pocket is comprised in a substantially vertical portion of (or extending from) the supply line to benefit of the effects of gravity on the liquid. By "substantially vertical" is meant vertical or inclined enough (for instance with an angle of at least 45°, preferably at least 60°) so as to be able to benefit of gravity effects.

In particular, this substantially vertical portion may consist in a portion of local enlargement of the diameter of the supply line.

Alternatively, the part defining the gas pocket may define several gas pockets thanks to the use of corrugations. Another alternative resides in the use of at least two coaxial communicating conduits, a first conduit containing the liquid and another conduit containing air or any other fluid that may be compressed to absorb the pressure stemming from a volume increase. These alternatives will be described below.

Thus, the system may comprise two coaxial conduits, the inner one of which having an open end communicating with the interior of the outer conduit.

Thanks to these dispositions, in the event liquid contained in the second conduit freezes and expands upon freezing, the front side of the liquid/solid area moves forward (as the liquid is not compressible) and pushes against (compresses) the gas volume contained in the first conduit.

According to a first sub-embodiment, the inner conduit comprises a closed end and the gas pocket is present in said inner conduit with the main supply line forming the outer conduit.

Thanks to these provisions, in the event of a volume increase of the outer conduit, the front side of the liquid/solid moves inside the internal line and pushes the gas, thus compressing it. Therefore, the gas contained in the inner conduit is compressed and absorbs pressure forces that could damage the outer conduit and other components of the supply system.

According to a second sub-embodiment, the outer conduit comprises a closed end and the gas pocket is present in said outer conduit.

The roles of the main supply line and the gas pocket are here reversed compared to the previous embodiment.

According to another embodiment, the part forming the gas pocket is a line, appendix or branch emerging in said passage and extending preferably globally in the same direction as at least a part of the supply line, without their axis coinciding. The diameter of this "dead-end" appendix may be larger than the diameter of the supply/feeding line itself.

According to still another embodiment of the present invention, the supply line comprises a corrugated part, the corrugations of which form a plurality of gas pockets.

An advantage of this solution is that in all areas where the line is substantially horizontal (i.e. horizontal or slightly inclined: see above), air bubbles will be trapped within each upper part of the corrugations. These bubbles will be compressed in the event of freezing.

The system may also comprise a gas trap in or between said at least one part defining the at least one gas pocket and the rest of the supply line in order to trap said gas.

When the supply system is placed within a moving vehicle comprising an exhaust system, such a disposition prevents the gas contained in the feeding line from flowing towards the exhaust system by being sucked or from escaping out of the gas pocket when the vehicle is placed on a slope up.

According to a particular feature of this embodiment, the gas trap is present under the form of a siphon, in particular in the shape of a U-bend or an inverted U-bend. Other equivalent shapes (N-bend, labyrinth . . . ) can of course be implemented. Alternatively, the gas trap may consist of a sealed box (with inside bend shapes, labyrinth, etc . . . ) with an inlet and outlet connected to the supply line, thus forming an added element.

In the absence of separate (added) trap, the part forming the gas pocket shall be dimensioned and/or oriented so as to take the above-mentioned issues (sucking and inclination of the vehicle) into account and to act as a gas trap itself.

Hence, according to an embodiment of the invention, the at least one part forming the gas pocket may be formed by an enlarged substantially vertical section of the supply line, extending between two transverse upper and lower sections and which is configured so as to enable the liquid to fall down to the bottom of the lower section while forming the gas pocket between the respective ends of this vertical section. Alternatively, the enlarged section may consist of a sealed box (with plunger, etc . . . ) having an inlet and an outlet connected to the supply line.

With proper dimensioning of the enlargement and considering the viscosity of the mixture contained in the supply line and its low debit flow, this enlargement acts as a drip. Therefore a gas pocket can be maintained, which can in turn be compressed in the event of freezing of the liquid.

According to a particular feature of the invention, the system may comprise a pump, located inside or outside the tank. Alternatively, other solutions for supplying the outlet of the system with the liquid can be foreseen (gravity, aspiration by exhaust gases, . . . ).

The pump is preferably a rotating pump (for instance a gear pump) preferably driven by a magnetically-coupled motor or a piston pump actuated by a spring and a magnetic coil.

When such a pump operates in a supply system for an exhaust system of a vehicle, the pressure in the supply line is generally adjusted to be within a range of about 1 and to about 5 bars (1 bar=$1 \cdot 10^5$ Pa), most often to about 5 bars.

The gas pocket is therefore compressed and the pressure in the supply line must be reduced/relieved after the pump is stopped.

To reduce the pressure in the supply line as quickly as possible after the pump's stop (engine stop), preferably within a few minutes (5 to 10, in practice), so that the gas pocket compressed under the effect of the pressure returns to its initial volume (or almost to its initial volume), to be able to be compressed again in the event of freezing, it is also proposed, according to particular features of the present invention:

to create at least one specific leakage in the structure of the pump (e.g. in its non-return valve) to make it possible for the liquid in the supply line to return into the tank (the leakages in the today's pumps are very limited and might in most of the cases be insufficient to reduce efficiently the pressure after the pump's stop); or
  to add a bypass connecting the supply line to the tank and provided with a valve, preferably an electrovalve, which when opened, makes it possible for the liquid under pressure in the supply line to return to the tank.
  In other words, the supply system advantageously comprises, more generally, means for reducing the pressure in the supply line, preferably means for returning liquid present in the supply line to the tank.

The supply of the liquid as well as its return to the tank, the case being, may be controlled by an engine control unit (ECU), some other control unit incorporated into a vehicle (for example the fuel system control unit, FCSU) or a special-purpose control unit receiving instructions/information from the ECU, from the FCSU or from some other control unit incorporated into a vehicle.

A filter, which is intended to protect the pump from impurities is preferably also foreseen, advantageously combined with the pump in a compact module, as described in International Application WO 2009/007405 in the name of the Applicant.

According to another particular feature of the invention, the system may comprise a pressure regulator, preferably integrated in the pump or connected to the tank.

In particular, the pressure regulator may be a mechanical pressure regulator based on a ball and spring or plate and spring mechanism. The pressure regulator may also consist of a pressure sensor combined with an electronic regulator.

Alternatively, for a piston pump, the pressure regulation may be obtained by a calibrated spring actuating the piston. In this case, the spring and piston push the liquid to the outlet of the pump.

In order to de-ice the liquid, the system may comprise a heater band surrounding the supply line or a resistive wire surrounding this line. Alternatively, the heater band or resistive wire is located inside the supply line or inside the line wall thickness.

For simplicity's sake, the gas in the pocket(s) is air.

The invention also relates to a supply line suitable for a supply system according to the invention, comprising either two coaxial conduits or an appendix emerging from it as described above.

The invention furthermore relates to a purification system for an internal combustion engine, comprising a supply system as described above, for injecting an exhaust gas purification solution into an exhaust passage of the internal combustion engine.

The gas pocket(s) here also act as a dampener of the pressure pulses.

Advantageously, the gas purification solution is a reducing agent capable of reducing the NOx present in the exhaust gases of the engine, such as an ammonia precursor in aqueous solution, preferably an aqueous urea solution.

Therefore, according to a particular feature of said purification system, the exhaust gas purification solution may be an eutectic water/urea solution. Solutions of AdBlue®, the urea content of which is between 31.8 and 33.2 wt % and 18 wt % of ammonia are particularly efficient. The invention may also be applied to urea/ammonium formate mixtures in aqueous solutions, sold under the trademark Denoxium® and containing around 13 wt % of ammonia. The latter have the advantage of freezing from and below −35° C. as opposed to −11° C. with other solutions.

Preferably, the tank is made in a material that is chemically resistant to the additive in question. In general such a material is metal or plastic. In the case of urea, polyamide or polyolefin resins, in particular polyethylene, and more particularly HDPE or high-density polyethylene, are preferred.

Moreover, the gas pocket is dimensioned considering the expansion volume of urea in freezing conditions in order to limit the pressure in the supply line.

The invention also concerns the use of a system according to the invention in a selective catalytic reduction system (SCR), preferably using an aqueous urea solution.

In this particular case, the gas pocket is dimensioned in order to avoid/limit the pressure in the feeding line when the urea is under freezing conditions, but also on the injector, the pump, the quick connectors, etc.

More generally, the supply system according to the present invention may be used in any other context where a liquid which expands upon freezing is carried into practice.

The coaxial lines or corrugated conduct is (are) preferably made out of a thermoplastic material, such as a PA (polyamide). The internal line can also be made of a PE (polyethylene) or a PU (polyurethane).

For the coaxial lines, a good dimensioning includes an internal diameter of the internal line ranging between about 2 and about 5 mm, and an internal diameter of the external line ranging between about 4 and about 10 mm. The thickness of the lines preferably ranges between about 0.5 and about 2 mm.

The present invention in possible embodiments is illustrated, in a non limitative way, by FIGS. 1 to 6.

Figure 3:
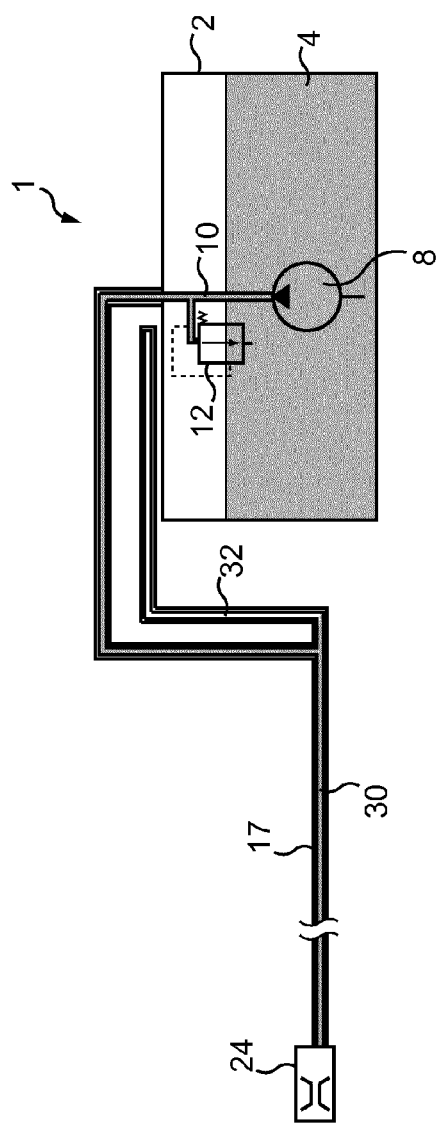
Figure 4A:
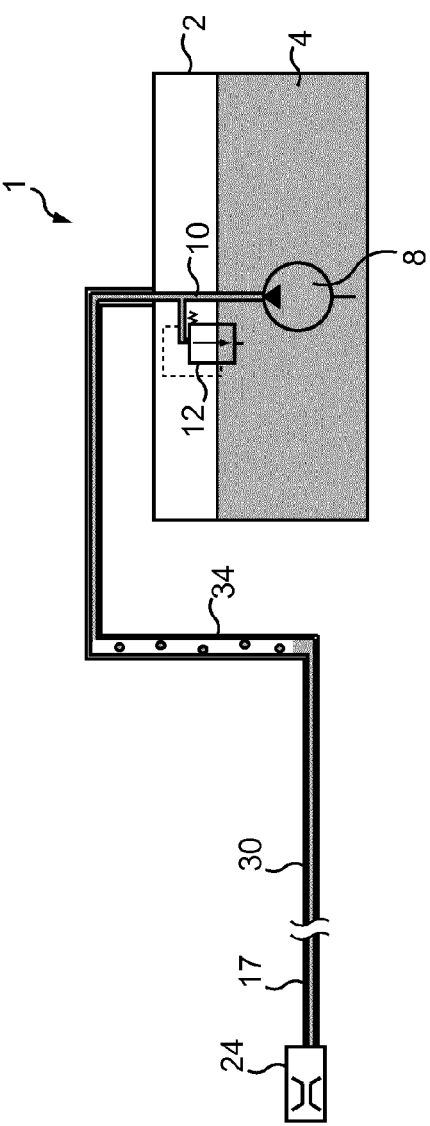
Figure 5:
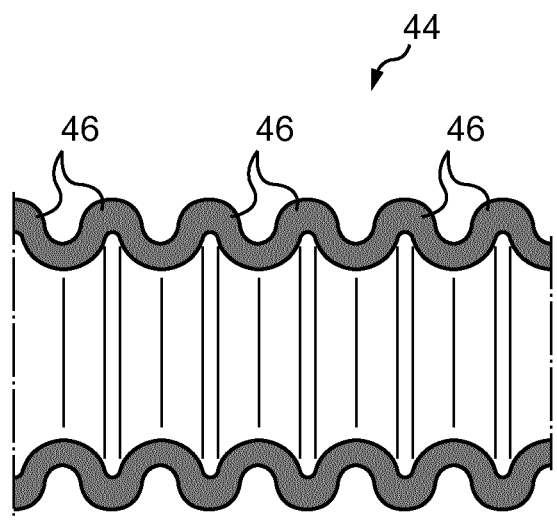
Figure 6:
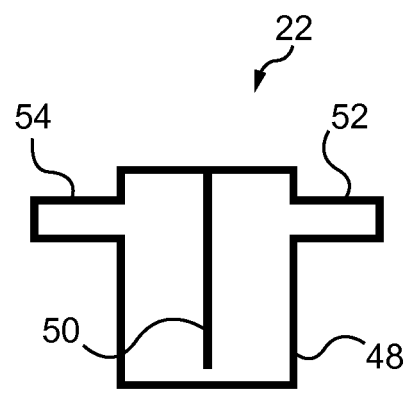

FIG. 1 consists in a schematic sectional view of a system according to the invention, in a first embodiment;

FIG. 2 consists in a schematic sectional view of a system according to the invention, in a second embodiment;

FIG. 3 consists in a schematic sectional through view of a system according to the invention, in a third embodiment;

FIG. 4A consists in a schematic sectional view of a system according to the invention, in a fourth embodiment;

FIG. 4B schematically illustrates a variant of the enlargement of FIG. 4A;

FIG. 5 consists in a schematic sectional view of a supply conduit according to a fifth embodiment of the invention, and FIG. 6 schematically illustrates a variant of the gas trap of FIGS. 1 to 5.

In these figures, identical reference signs denote identical or similar components.

The system 1 of the embodiment presented in FIG. 1 comprises an SCR tank 2 filled with a liquid 4 (an eutectic water/-urea composition in the pictured embodiment) and communicating with a supply circuit 6 through a pump 8 for feeding the liquid 4 into the circuit and located here in the tank. It is combined with a filter (not illustrated on the drawings) in a compact module.

The supply circuit 6 comprises a connection 10 leaving the tank, which in the particular embodiment shown in this Figure, communicates with a branch connected to a pressure regulator 12, located inside the tank.

In this embodiment, the pressure regulator is a mechanical pressure regulator based on a ball and spring or plate and spring mechanism. Alternatively, the pressure regulator may consist of a pressure sensor combined with an electronic regulator.

Alternatively, for a piston pump, the pressure regulation may also be obtained by a calibrated spring actuating the piston. In this case, the spring and piston push the liquid to the outlet of the pump.

Upon leaving tank 2, the pump is connected to a coaxial line comprising an outer conduit or external feeding line 14 surrounding an inner conduit or internal line 16, the latter forming an air pocket. It comprises, in this embodiment, a substantially vertical section between two substantially horizontal sections (though other orientations may work).

Both the internal and external lines are made out of a thermoplastic material such as PA with internal diameters and thicknesses comprised in the ranges defined above.

In addition, a heater band or resistant wire 17 is placed around the outer conduit 14 in order to de-ice the liquid contained therein when required.

The internal conduit 16 has an open end 18 communicating with an outlet of the external conduit 14 and an opposite closed end 20 located near the end of the external conduit 14 and near the connection 10. Therefore, in the event the liquid contained in the external feeding line freezes and expands, the front side of the liquid/solid area moves forward in the internal line 16 as the liquid is not compressible, compressing the gas volume contained therein. The compression of the gas thus allows for pressure reduction in feeding line 14 and on the components of the supply system.

The location of open end 18 may vary. In the present embodiment, it is located in the vicinity of an injector 24 that the lines lead to and which is adapted to inject the liquid 4 into the exhaust system of a vehicle equipped with the supply system 1.

The presence of the air pocket also damps pressure pulses and reduces the pressure range during the injection. The pressure regulation in general is thus improved.

An optional air trap 22, consisting in the present embodiment in an inverted U-shaped portion of the coaxial lines, is placed downstream of the open end 18 and in the vicinity thereof. This trap prevents the gas contained in the internal line 16 from escaping therefrom.

Depending on the volume of the part forming the gas pocket, this trap can be located elsewhere on the line.

The embodiment of FIG. 1 also comprises an optional bypass 24 connecting the feeding line 14 to the tank 2 and equipped with an electrovalve 28 for returning liquid under pressure present in the feeding line 14 to the tank 2 once the pump 8 is stopped.

The air pocket which was compressed in the internal conduit 16 during the operation of the pump 8 can thus return to its initial state, in order to be able of being compressed again in the event the liquid freezes again.

Referring now to FIG. 2, another embodiment of the invention is shown wherein the roles of the external line 14 and the internal line 16 are reversed, the internal line 16 becoming the feeding line containing the liquid and the external line 14 becoming the part forming a gas pocket.

Referring now to FIG. 3, another embodiment of the invention is shown which includes providing the feeding line 30 with a branch 32 or appendix forming a gas pocket. This branch 32 may be located anywhere between the injector and the gas tank 2 and extends in the present embodiment along a part of the vertical intermediate section of the feeding line 30 and then along a part of the horizontal section of the latter proximate the tank 2. A very compact arrangement results from these provisions but other shapes and orientations for a dead-end appendix can be foreseen. herein this embodiment, the supply line 30 and the appendix 32 are also surrounded by a heater band or resistive wire 17.

The internal diameter of dead-end appendix 32 can be larger than the one of feeding line 30: approximately 2 to 20 mm against approximately 2 to 10 mm, for a thickness comprised approximately between 0.5 and 2 mm.

As for the previous embodiments, in the event of expansion of the liquid contained in feeding line 30, caused by freezing, the front side of the liquid/solid moves forward in the branch 32, thus pushing the gas contained therein.

Referring now to FIG. 4, another embodiment of the invention is shown which includes an enlargement 34 of a feeding line 30 along a vertical portion of the latter. With proper dimensioning of the enlargement 34 and considering the viscosity of the mixture contained in feeding line 30 and its low debit flow (in practice 0.01 to 5 liters per hour with urea), this enlargement acts as a drip. Therefore a gas pocket can be maintained, which can in turn be compressed in the event of freezing of the liquid.

In this embodiment, the enlargement 34 has an internal diameter of approximately 3 to 30 mm, whereas the rest of the feeding line 30 has an internal diameter of approximately 2 to 10 mm, for a thickness of approximately 0.5 to 2 mm.

As shown on FIG. 4B, the enlargement 34 may also consist of a sealed box 36 having an inlet 38 and an outlet 40 for connecting the box 36 to the feeding line 30. The box 36 also comprises a plunging tube 42 connected to the inlet 38 and descending up to the vicinity of the bottom of the gas pocket capacity formed by the box 36, so as to separate the gas from the liquid circulating in the feeding line 30.

An air trap 22 and/or a bypass 26 with an electrovalve 28 as in the embodiment described with reference to FIG. 1 are not represented on FIGS. 2 to 4A,4B, but such devices are preferably also present in these embodiments.

FIG. 5 is a schematic sectional view of a conduit 44 which may replace any of the coaxial conduits, dead-end appendix or enlarged section of the supply/feeding lines of the embodiments of FIGS. 1 to 4.

It consists in a corrugated conduit having a plurality of corrugations 46 in the upper part of which air bubbles can be trapped for picking up a change of volume of the liquid, e.g. urea, in case of frost.

FIG. 6 shows another embodiment of the gas trap 22. It is implemented under the form of a sealed box 48 comprising an inner wall 50 forming a U shaped channel.

This box 48 also comprises, for its connection to anyone of the feeding lines 14, 16, 30 described above, as an added element, an inlet 52 and an outlet 54.

Naturally, numerous modifications can be made to the exemplary embodiments previously described without leaving the context of the invention.

The invention claimed is:

1. A supply system for a liquid, comprising:
   a liquid tank,
   a liquid supply line comprising a passage for the liquid from the tank to an outlet of the supply system,
   a mechanism to reduce pressure in the supply line, and
   a mechanism to return liquid present in the supply line to the tank,
   wherein the supply line includes at least one part containing at least one gas pocket including an opening communicating with the passage, the opening allowing a front side of the liquid to move forward in the gas pocket in an event of freezing to compress a gas contained in the gas pocket to take up a change of volume of the liquid.

2. A supply system according to claim 1, wherein at least a portion of the gas pocket is comprised in a substantially vertical portion of, or extending from, the supply line.

3. A supply system according to claim 1, wherein the supply line comprises inner and outer coaxial conduits, the inner coaxial conduit including an open end communicating with an interior of the outer coaxial conduit.

4. A supply system according to claim 3, wherein the inner coaxial conduit comprises a closed end.

5. A supply system according to claim 3, wherein the outer coaxial conduit comprises a closed end.

6. A supply system according to claim 1, wherein the part containing the gas pocket is an appendix emerging in the passage.

7. A supply system according to claim 1, wherein the supply line comprises a corrugated part, corrugations of which form a plurality of gas pockets.

8. A supply system according to claim 1, wherein the at least one part containing the gas pocket is formed by an enlarged substantially vertical section of the supply line, extending between two transverse upper and lower sections and which is configured to enable the liquid to fall down to a bottom of the lower section while forming the gas pocket between respective ends of the vertical section.

9. A supply system according to claim 8, wherein the enlarged section is formed by a sealed box including an inlet and an outlet to connect the box to the supply line.

10. A supply system according to claim 9, wherein the sealed box comprises a plunging tube connected to the inlet of the box and extending towards a bottom of the enlarged section to separate the gas from a flow of the liquid.

11. A supply system according to claim 1, wherein the mechanism to return the liquid present in the supply line to the tank comprises at least one leakage formed in a structure of a pump or a bypass connecting the supply line to the tank and including a valve, or an electrovalve.

12. A supply system according to claim 1, further comprising a gas trap in or between the part containing the at least one gas pocket and a rest of the supply line to trap the gas.

13. A supply system according to claim 12, wherein the trap is in a shape of a siphon, or includes a U-bend, or an inverted U-bend.

14. A supply system according to claim 12, wherein the trap is formed in a sealed box including an inlet and an outlet connected to the supply line.

15. A supply system for a liquid, comprising:
   a liquid tank,
   a liquid supply line comprising a passage for the liquid from the tank to an outlet of the supply system,
   means for reducing pressure in the supply line, and means for returning liquid present in the supply line to the tank, wherein the supply line includes at least one part containing at least one gas pocket including an opening communicating with the passage, the opening allowing a front side of the liquid to move forward in the gas pocket in an event of freezing to compress a gas contained in the gas pocket to take up a change of volume of the liquid.

16. A supply system for a liquid, comprising:
a liquid tank, and
a liquid supply line comprising a passage for the liquid from the tank to an outlet of the supply system,
wherein the supply line includes at least one part containing at least one gas pocket including an opening communicating with the passage, the opening allowing a front side of the liquid to move forward in the gas pocket in an event of freezing to compress a gas contained in the gas pocket to take up a change of volume of the liquid, and wherein the supply line comprises inner and outer coaxial conduits, and the part containing the gas pocket is the inner coaxial conduit or the outer coaxial conduit.

17. A supply system according to claim 1, wherein the supply line comprises inner and outer coaxial conduits, and the part containing the gas pocket is the inner coaxial conduit or the outer coaxial conduit.

18. A supply system according to claim 15, wherein the supply line comprises inner and outer coaxial conduits, and the part containing the gas pocket is the inner coaxial conduit or the outer coaxial conduit.

19. A supply system according to claim 15, wherein the means for returning liquid present in the supply line to the tank comprises at least one leakage formed in a structure of a pump or a bypass connecting the supply line to the tank and including a valve, or an electrovalve.

20. A supply system according to claim 15, wherein at least a portion of the gas pocket is comprised in a substantially vertical portion of or extending from, the supply line.

* * * * *